Sept. 29, 1931. T. B. NAKKERUD 1,824,786
EXPRESSMAN'S TRUCK
Filed Dec. 20, 1928
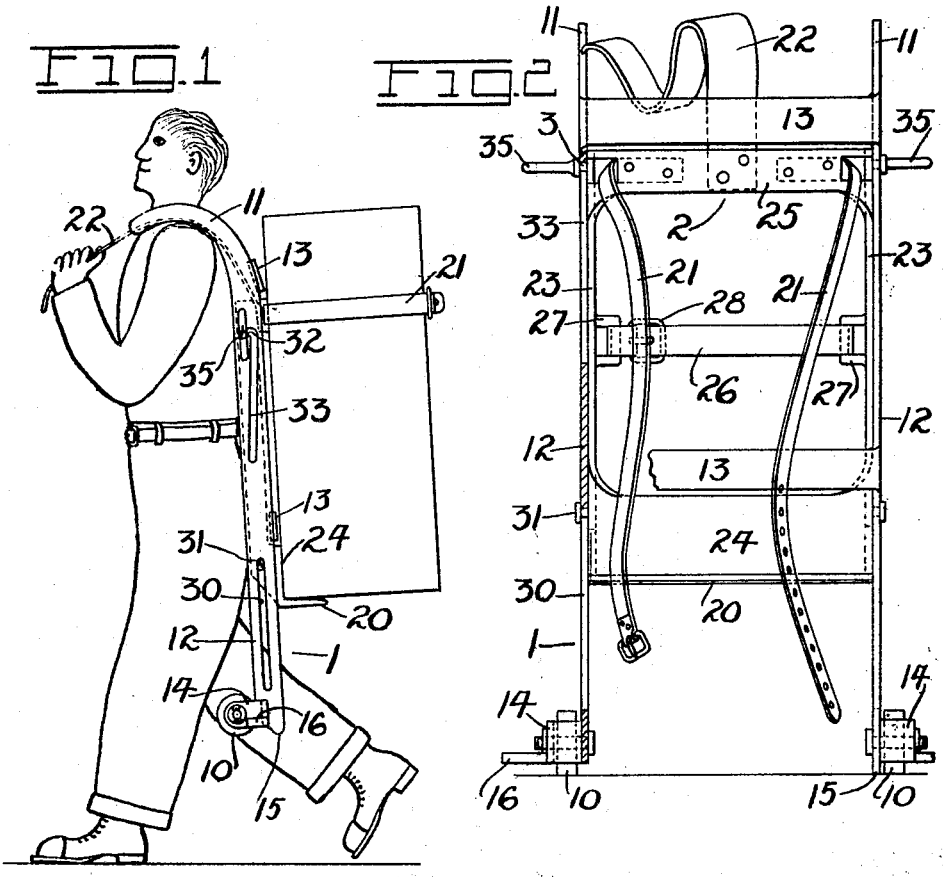
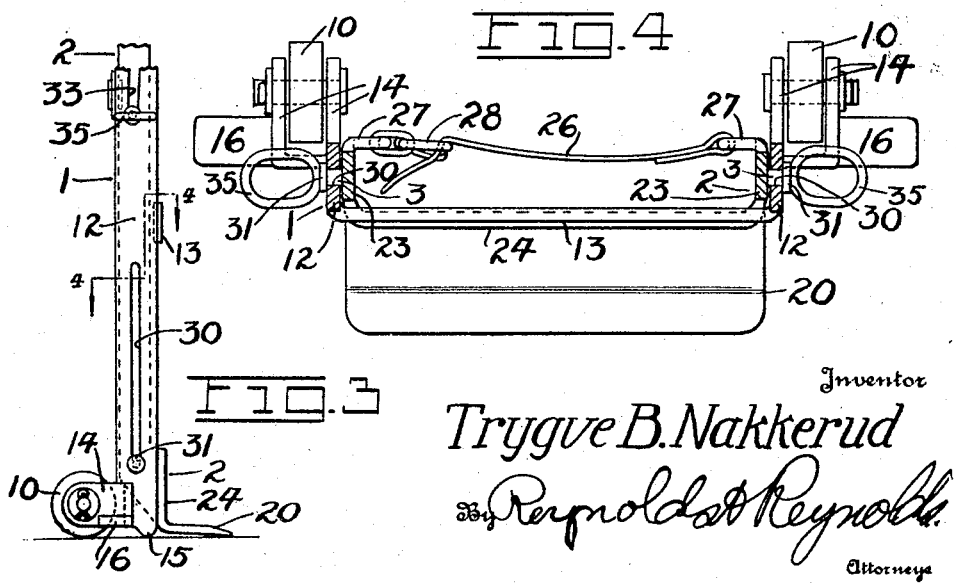
Inventor
Trygve B. Nakkerud
By Reynold & Reynold
Attorneys Patented Sept. 29, 1931

1,824,786

UNITED STATES PATENT OFFICE

TRYGVE B. NAKKERUD, OF SEATTLE, WASHINGTON

EXPRESSMAN'S TRUCK

Application filed December 20, 1928. Serial No. 327,208.

My invention relates to hand trucks, particularly such as are intended for the use of expressmen in handling trunks and like heavy single pieces, which are ordinarily lifted from the floor and carried upon the expressman's back.

It is one object of my invention to provide a hand truck by means of which such baggage may be wheeled about, where conditions permit, as, for example, upon the baggage floor of a depot, and which will then permit the trunk to be elevated above the floor into position where the expressman may easily lift it, with the truck, upon his back without straining, so that both trunk and truck may be carried away on the back of the expressman. The trunk and truck may be carried up a flight of steps, and at the top they may again be wheeled, either with the trunk in the elevated position or dropped again adjacent the floor.

It is an object to provide a truck of the general character described above, which is simple in its construction and reliable in operation, and which will be convenient in use.

It is a further object to provide such a truck which, with parts in their elevated position, will have members depending toward the floor, yet will have no transverse obstruction lower than the trunk itself to impede the expressman, or to strike his legs as he walks.

It is a further object to provide means in association with such a truck to assist in lifting and supporting the load upon the expressman's back.

Other objects, and particularly those which relate more specifically to structural details, will be ascertained from a study of the drawings, specification and claims forming a part of this application.

My invention comprises the novel parts, and the novel combination and arrangement thereof, as shown in the accompanying drawings, described in the specification, and particularly defined by the claims terminating the same.

In the accompanying drawings I have shown my invention in a form which is now preferred by me.

Figure 1 is a side elevation of my device shown in use, the trunk supporting frame being in elevated position.

Figure 2 is a front elevation of the same, also in elevated position, with parts broken away.

Figure 3 is a side elevation of the truck in lowered position, the upper portion being omitted.

Figure 4 is a transverse section through the truck, substantially on the line 4—4 of Figure 3.

Essentially my invention comprises a floor engaging frame, generally designated by the numeral 1, and a trunk supporting frame, generally designated by the numeral 2, the one being guided for movement lengthwise of the other, and preferably provided with some means whereby the two frames may be held, so long as may be desired, in elevated position, or dropped at will so that the trunk supporting frame lies close to the floor. As is common in hand trucks, wheels 10 would ordinarily be provided for direct engagement with the floor, and the trunk supporting frame 2 would be provided with a ledge 20 to engage beneath the bottom of the trunk, and might be provided, also, with straps 21 intended to pass about the trunk and secure its upper end, as will be evident in Figure 1. Curved handles 11, forming upward extensions of the side members of the frame 1, may also be provided, as is common in trucks, but these handles 11 preferably are so formed as to engage over the shoulders of the expressman when the truck is carried in this manner, and assist in supporting the load. A strap or straps 22, which preferably are secured to the trunk supporting frame 2, may also pass over his shoulders and assist in supporting the load, as well as serving at times as a means of raising the load, in a manner which will be explained hereafter.

The floor engaging frame 1 may be composed of two side members 12, connected by cross members 13, but I prefer that none of these cross members lie at a level lower than the level of the trunk supporting ledge 20 when the latter is in raised position. It is the purpose of this to permit the expressman to get one leg immediately beneath the elevated trunk, as he kneels to lift it upon his back, and to permit free leg action of the expressman in walking, so that he may walk naturally without danger of engaging any member of the truck with his legs, as is illustrated in Figure 1. Thus the wheels 10 are journaled in the depending lower end of the side members 12 to support the truck in upright position. These journals may be formed in offset ears 14, as best seen in Figures 1 and 3, and a depending toe 15 may be provided to engage the floor in the plane of the periphery of the wheels 10, when the frame 1 is in upright position. For a purpose which will be apparent later, a foot engaging ledge 16 may also be provided at the lower end of the frame 1, this preferably projecting laterally and outwardly of the frame. There is little danger of such a ledge damaging door frames or the like, inasmuch as the over-all width of the truck is usually considerably less than the width of the trunk which is to be carried thereon.

Like the frame 1, the frame 2 also has two or more transverse members connecting side members 23. The transverse member in the one case may be the ledge 20 and its backing piece 24, and in the other instance the transverse member 25, to which the strap 22 may be secured, and to which also may be secured the trunk securing straps 21. I may also provide a flexible or yieldable cross connection, such as the strap 26 connecting eyes 27 supported in the longitudinal members 23, this strap 26 being adjustable, as indicated by the buckle 28, so that the truck may be adjusted to fit comfortably against the back of the expressman.

As has been stated, the frame 2 is slidable lengthwise of the frame 1, and is guided in the frame 1 during such sliding movement. For this purpose a lower longitudinal slot 30 may be provided in the frame members 12, and a pin 31, projecting thereinto from the frame members 23, guides the lower portion of the frame 2 in the frame 1. Similarly a slot 33 in the upper portion of the frame members 12 receives a pin 3 projecting from the upper portion of the frame 2. Preferably the slot 33 terminates at its upper end in an upwardly directed shoulder or ledge, best indicated in Figure 1 at 32. From this it will be observed that when the frame 2 is raised, and the pins 3 moved laterally sufficiently to engage them with the ledge 32, the frame 2 will be held in such elevated position. To assist in raising it the strap 22 may be used, or handles 35, which are in effect extensions of the pin 3, may be employed. It is the function of the ledges 16 to be engaged by the feet of the expressman during this lifting operation to hold the frame 1 down. If preferred, the trunk may be moved to such elevated position while the truck is in horizontal position, and the trunk is lifted by swinging the truck into upright position.

It will be evident that such a truck may be cheaply, easily, and lightly, yet strongly constructed of inexpensive iron pieces, together with the necessary straps and rollers. It may be employed as an ordinary hand truck, with the trunk resting on the ledge 20 and against the combined frames 1 and 2, the frame 2 being ordinarily in the lowered position, although it might still be employed as a truck for wheeling the trunk, with the frame 2 elevated. However, when it is desired to carry the load on the expressman's back it is only necessary to hold down the frame 1 by engagement of the ledges 16, and to lift the frame with its load attached by means of the handles 35 or the straps 22, or both. Now, with the load elevated, the expressman may steady it, and kneel with one leg immediately beneath the trunk, and in this position it is a simple matter to throw the load forward upon the expressman's back, and for him to rise beneath the load, for it is not necessary for him, in this position, to lift the load, except as he is beneath it. He may now carry it upon his back in the usual way, or he may hook the handles 11 and the strap 22 over his shoulder to assist him in carrying the load in the manner indicated in Figure 1. On reaching a place where the load may be wheeled, it is a simple matter to kneel again, placing the wheels 10 on the floor, and then to withdraw the leg from beneath the load, and to commence wheeling the load and truck. The truck may be made of sufficiently light construction that the added weight is not a serious factor; nor, as has been pointed out, will its width be such as to cause damage in any place where the trunk itself can be moved through. The feature of having no cross pieces below the trunk itself, and thus permitting free action of the expressman's legs in walking, is of considerable importance to the practical success of this truck.

What I claim as my invention is:

1. In an expressman's truck, a floor-engaging frame terminating at its lower end in spaced, unconnected legs, floor-engaging rollers carried thereon, a trunk-supporting frame including a ledge, and guided at its sides only on said floor-engaging frame for movement therealong between an elevated position, wherein the user's leg may be placed beneath the ledge, and a lowered position, with the ledge close to the floor, and means for maintaining the trunk-supporting frame in its elevated position.

2. In an expressman's truck, a frame terminating at its lower end in two depending, spaced, and unconnected floor engaging legs, and a second frame having means for positively supporting a trunk, said floor engaging frame having a longitudinal slot terminating at its upper end in an offset seat, said second frame having a pin near its top and projecting into said slot, a handle secured on the end of said pin to manually raise said second frame to an elevated position, said pin being adapted to engage said offset seat to hold the second frame in said elevated position.

3. In an expressman's truck, a frame terminating at its lower end in two depending, spaced, and unconnected floor engaging legs, and a second frame having means for positively supporting a trunk, and slidable relative to the first frame, said floor engaging frame having longitudinal slots and said second frame having pins adapted to project into the corresponding slots, said pins having heads on the outside of the floor engaging legs to prevent said legs from spreading.

Signed at Seattle, Washington, this 14th day of December, 1928.

TRYGVE B. NAKKERUD.